(12) United States Patent
Knuppel

(10) Patent No.: US 6,230,434 B1
(45) Date of Patent: May 15, 2001

(54) ANIMAL TRAP HAVING ANTI-BACKSPIN FEATURE

(75) Inventor: Harry E. Knuppel, Albia, IA (US)

(73) Assignee: Kness Mfg. Co., Inc., Albia, IA (US)

(*) Notice: Subject to any disclaimer, the term of this patent is extended or adjusted under 35 U.S.C. 154(b) by 0 days.

(21) Appl. No.: 09/385,316

(22) Filed: Aug. 30, 1999

Related U.S. Application Data

(63) Continuation-in-part of application No. 09/307,133, filed on May 7, 1999, now Pat. No. 6,125,576.

(51) Int. Cl.[7] .................................................. A01M 23/10
(52) U.S. Cl. ..................................................... 43/74
(58) Field of Search .................................. 43/74, 67, 69, 43/71

(56) References Cited

U.S. PATENT DOCUMENTS

| | | | |
|---|---|---|---|
| 1,067,909 | * | 7/1913 | Foisher ...................................... 43/74 |
| 1,214,060 | * | 1/1917 | Mutz ........................................ 43/74 |
| 1,758,952 | * | 5/1930 | Kness ....................................... 43/74 |
| 2,433,913 |   | 1/1948 | Kness . |
| 2,594,182 | * | 4/1952 | Kness ....................................... 43/74 |
| 2,643,480 | * | 6/1953 | Jones ....................................... 43/74 |

* cited by examiner

*Primary Examiner*—Kurt Rowan
(74) *Attorney, Agent, or Firm*—Zarley, McKee, Thomte, Vorhees & Sease

(57) ABSTRACT

A mouse or rodent trap includes a housing having an elongated rotatable paddle member therein. A trigger assembly engages the paddle member and releases the paddle member for rotation when the trigger assembly is engaged by a mouse or rodent entering the housing. The trigger assembly is formed completely of plastic, and is snapped together during assembly. An anti-backspin mechanism permits the rotatable paddle member to rotate in one direction but prevents rotation in the opposite direction.

7 Claims, 5 Drawing Sheets

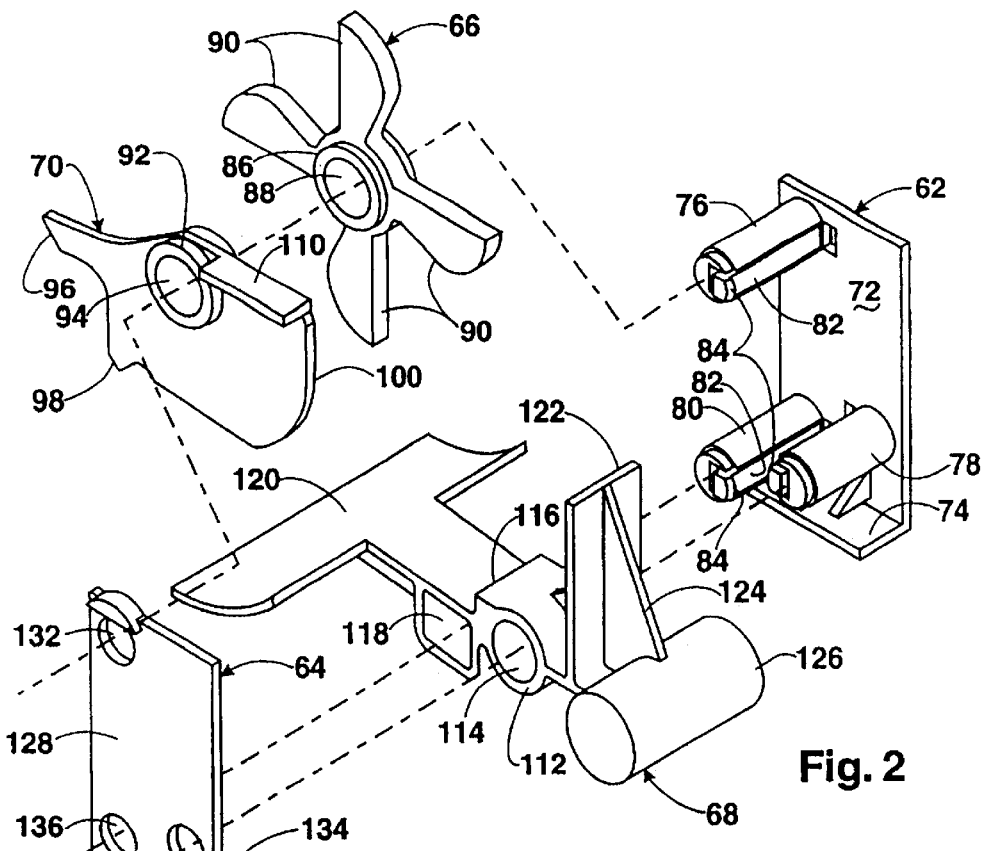
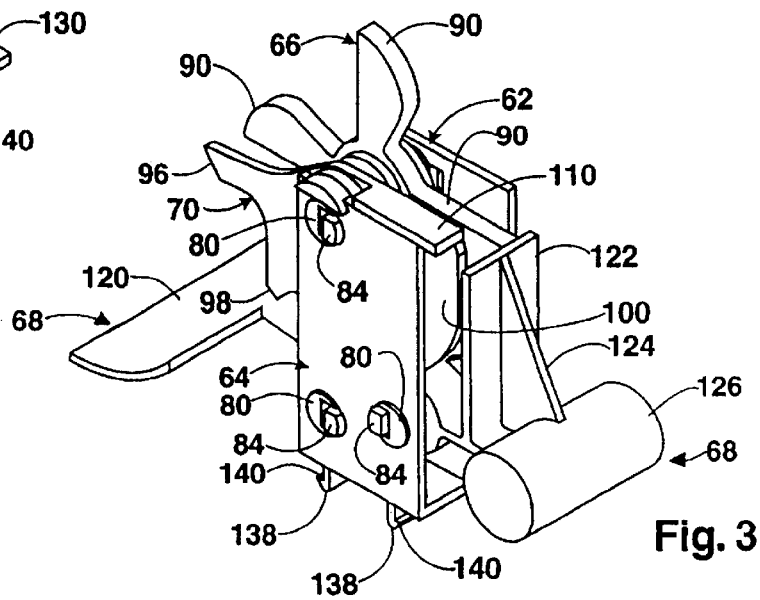

ANIMAL TRAP HAVING ANTI-BACKSPIN FEATURE

CROSS-REFERENCE TO A RELATED APPLICATION

This is a continuation-in-part of application Ser. No. 09/307,133 filed May 7, 1999, now U.S. Pat. No. 6,125,576.

BACKGROUND OF THE INVENTION

The present invention relates to a new and useful improvement in an animal trap of the type disclosed in previous letters U.S. Pat. No. 1,758,952 dated May 20, 1930 and U.S. Pat. No. 2,433,913 dated Jan. 6, 1948.

These prior art traps were generally constructed from metal parts. Consequently the intricate mechanisms within these prior art traps were difficult to manufacture and assemble. Also, they required a metal weight for a counterbalance for the trip mechanism.

Therefore, a primary object of the present invention is the provision of an improved mouse or rodent trap and method for assembling same.

A further object of the present invention is the provision of an improved trap made of plastic rather than metal.

A further object of the invention is to provide an anti-backspin mechanism for preventing the trapped animal from exiting through the way the animal entered the trap.

A further object of the present invention is to provide an improved method for snapping together the parts of the trap for assembly.

A further object of the present invention is the provision of an improved trap which has a trigger mechanism constructed completely of plastic and which does not require a special metal weight for the counterbalance to the trip mechanism.

A further object of the present invention is the provision of an improved trap and method of assembling same which is economical, durable in use, and efficient in manufacture.

SUMMARY OF THE INVENTION

The foregoing objects may be achieved by an animal trap having a housing with exterior walls forming an enclosed compartment. The enclosed compartment is divided into an entrance compartment and a trap compartment. The housing includes an animal opening for providing access for an animal to enter into the entrance compartment.

Within the entrance compartment is a trigger member which is movable from a set position to a trigger position in response to being engaged by an animal within the entrance compartment.

A paddle is mounted for rotation within the enclosed compartment and a spring urges the paddle in a first rotational direction for engaging the animal and moving the animal from the entrance compartment to the trap compartment.

A latch mechanism is in a latched position engaging the paddle and preventing the paddle from moving in its first rotational direction. The latch mechanism is movable to a release position in response to the trigger member moving to its triggered position for releasing the paddle to rotate in its first direction to move the animal from the entrance compartment to the trap compartment.

An anti-backspin mechanism is provided for preventing the animal from escaping by rotating the paddle in a second rotational direction opposite from the first rotational direction. The anti-backspin device mechanism permits movement of the paddle in its first rotational direction.

According to one feature of the invention the anti-backspin mechanism comprises a first anti-backspin member which is a ratchet wheel having ratchet teeth and a second anti-backspin member comprising a spring pawl engaging one of the ratchet teeth.

BRIEF DESCRIPTION OF THE FIGURES OF THE DRAWINGS

FIG. 2 is an exploded perspective view of the trigger mechanism of the present invention.

FIG. 3 is a perspective view of the trigger mechanism in its assembled condition.

DETAILED DESCRIPTION OF THE PREFERRED EMBODIMENT

Figure 1:
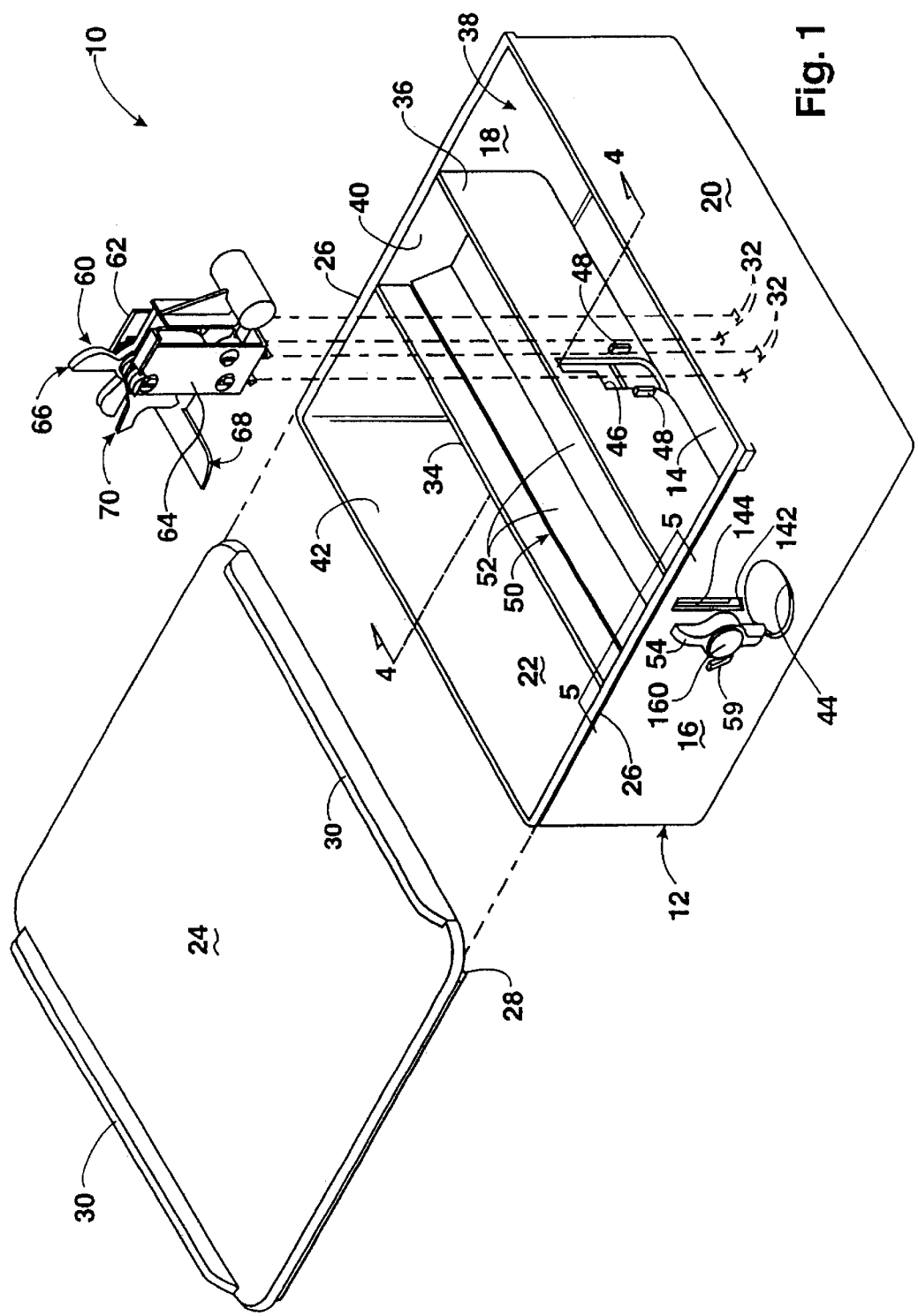
FIG. 1 is an exploded perspective view of the trap of the present invention.

Referring to the drawings the numeral 10 generally designates the mouse or rodent trap of the present invention. Trap 10 includes a housing 12 having a bottom wall 14, side walls 16, 18, and end walls 20, 22. The upper edges of side walls 16, 18 include side flanges 26 which are adapted to engage elongated slide tracks 28 on the opposite sides of top cover 24. Top cover 24 is also provided with handles 30 for facilitating the sliding movement of the top cover 24. Top cover 24 may be constructed of plastic and may be either opaque or transparent.

The bottom wall 14 of the housing 12 includes four snap receiving holes 32 for attachment of a trigger mechanism to be described in more detail hereafter. A housing 12 also includes a forward partition 34 and a rear partition 36 which together form a counterbalance compartment 38, a central compartment 40, and a trap compartment 42. Rear partition 36 includes a curved portion 39 (FIG. 4) adjacent its forward end and a mechanism slot 46 formed therein. Sidewall 16 is provided with a hole 44 therein for permitting a mouse or rodent to enter the central compartment 40. The rear surface of partition 36 is provided with a pair of standoff stubs 48.

A paddle member 50 is mounted within the central compartment 40 for rotation about its longitudinal axis. Paddle member 50 includes a plurality of radially extending paddles 52.

Figure 6:
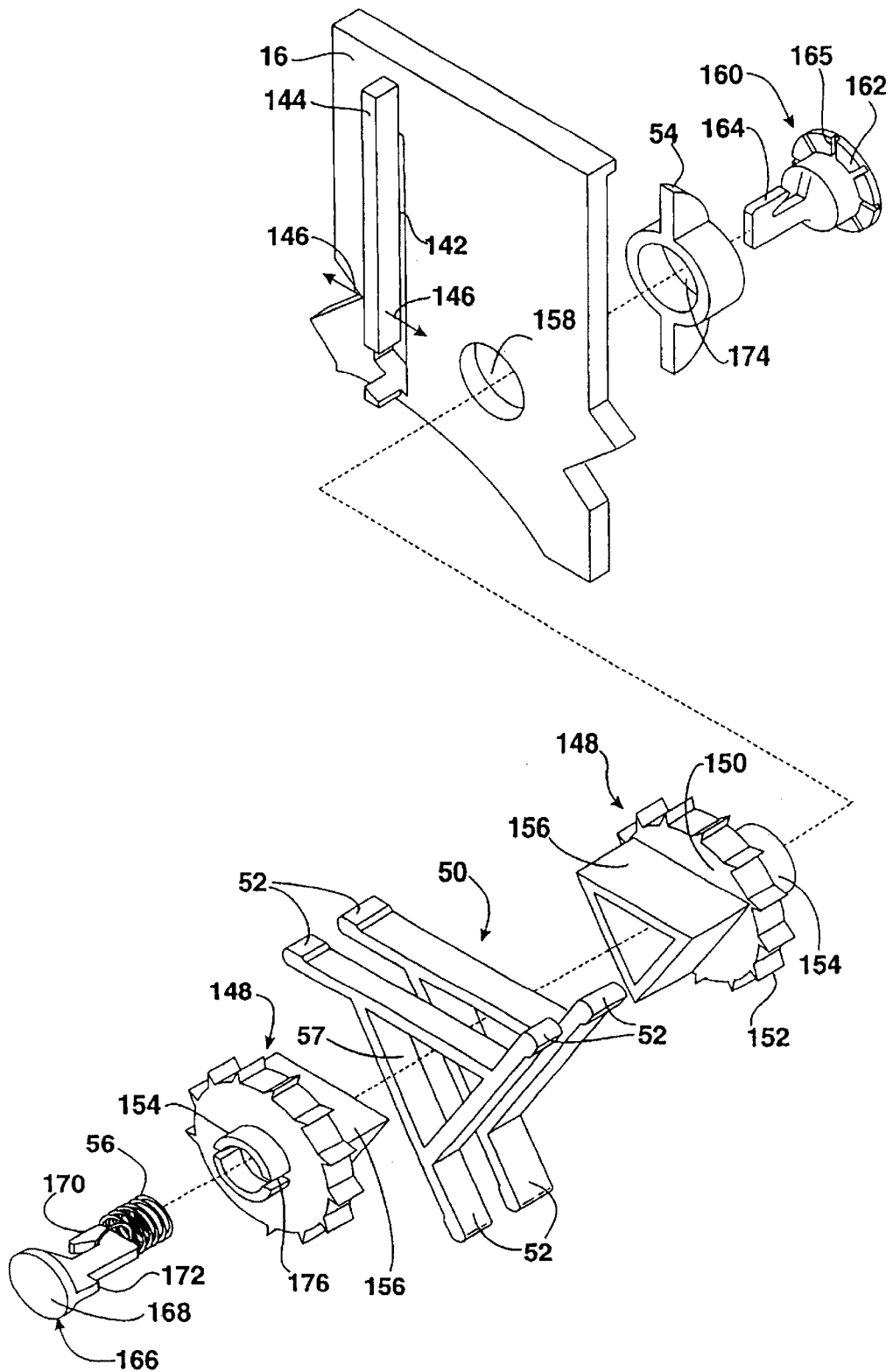
FIG. 6 is an exploded perspective view of the anti-backspin mechanism.

Referring to FIG. 6, a pair of ratchet members 148 each include an inner hub 156 which is press fitted within a triangular opening 57 in paddle member 50. Ratchet members 148 also each include a ratchet wheel 150 having ratchet teeth 152 on its outer peripheral edge, and an outer hub 154 which fits within and rotates within bearing opening 158 in wall 16. This permits paddle 50 to rotate about its longitudinal axis.

A first spring holder 166 includes a head 168, a hook 170, and a flange 172. Hook 170 receives one end of spring 156 and flanges 172 fit within slots 176 of hub 154 to prevent spring holder 166 from rotating with respect to paddle 50.

A spring holder 160 is adapted to hold the other end of spring 56 and includes a head 162, and a hook 164 for connecting to the other end of spring 56, hook 164 extends through a central opening 174 in handle 54 and a plurality of star teeth 165 on head 162 engage complimentary teeth (not shown) on handle 54.

Handle 54 is free to rotate independently of paddle 50. Rotation of handle 54 causes rotation of spring holder 160 because of the engagement of the star teeth 165 on spring holder 160 and the complimentary teeth (not shown) on handle 54. The opposite end of spring 56 is not free to rotate independently of paddle 50 because of the engagement of flanges 172 within slots 176 of the ratchet member 148. Accordingly a tension builds up in spring 56 in response to rotation of handle 54.

Figure 4:
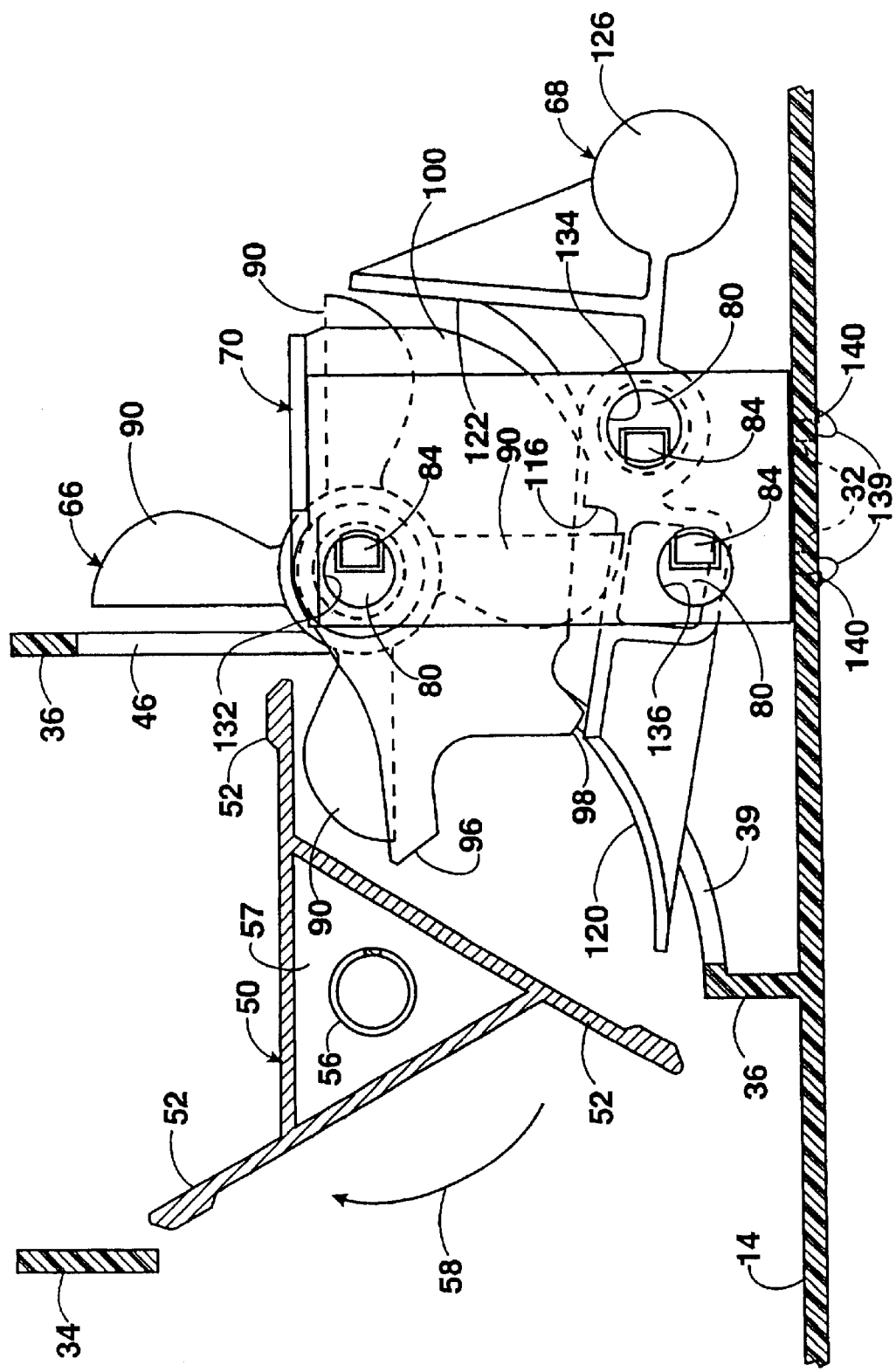
FIG. 4 is a sectional view taken along line 4—4 of FIG. 1.

This causes the spring 56 to urge the paddle 50 in a clockwise direction as indicated by arrow 58 in FIG. 4. A wedge tooth 59 is formed on the outside surface of housing 12 and is adapted to permit handle 54 to rotate in a clockwise direction to increase the torsion in spring 56 while at the same time providing an anti back spin of handle 54 in a counterclockwise direction.

A trigger assembly 60 includes a first side plate 62, a second side plate 64, a rotatable member 66, a trip member 68, and a trip return member 70.

First side plate 62 includes a vertical plate 72 having a horizontal leg 74 at its lower end. First, second and third shafts 76, 78, 80 extend perpendicularly from the vertical plate 72 and each include a snap tab 82 having a lip 84 on its outer end. Snap tabs 82 are formed from plastic and are spring mounted so as to spring radially outwardly away from the shafts 76, 78, 80.

Rotatable member 66 includes a central hub 86 having a hub bore 88 extending therethrough. A plurality of radial arms 90 extend radially outwardly from the hub 86.

Trip return member 70 comprises a hub 92 having a hub bore 94 extending therethrough. A forward finger 96 extends forwardly from the trip return member and a lower finger 98 protrudes downwardly at the forward end of the trip return member 70. A rear cam surface 100 is at the rear of the trip return member 70 and an upper flange 110 is positioned adjacent the top edge of the return trip member 70.

Trip member 68 includes a hub 112 having a hub bore 114 extending therethrough. A trip shoulder 116 faces forwardly, and a lost motion hole 118 is also provided through the trip member 68 in a direction parallel to the hub bore 114. A trip pan 120 is provided adjacent the forward end of trip member 68 and a cam plate 122 extends vertically upwardly adjacent the rear end of the trip member 68. Plate 122 is held in position by a gusset 124, and a counterweight mass 126 is provided at the rear end of the trip member 68. Trip member 68 is constructed completely of plastic and the mass 126 is also plastic as contrasted with the use of a metal counterweight in prior devices.

Second side plate 64 includes an upstanding plate 128 having a horizontal leg 130 at its lower end. First, second and third snap holes 132, 134, 136 extend through the vertical upstanding plate 128. Extending downwardly from the horizontal leg 130 are two snap tabs 138, each of which includes a lip 140 at its lower end. Vertical plate 62 is also provided with similar snap tabs 138, 140, although those are not shown in the drawings.

The entire trigger assembly 60 is made completely of plastic and is adapted to snap together during construction. This is an improvement over prior devices which were constructed of metal and which required complicated assembly and manufacturing techniques.

To assemble the trigger assembly 60, the shaft 76 of plate 62 is extended through the bore 88 of rotatable member 66 and the bore 94 of the trip return member 70. Then first shaft 78 is fitted within the bore 114 of trip member 68 while at the same time the third shaft 80 is inserted through the lost motion hole 118 in the trip member 68. Finally the first, second and third shafts 76, 78, 80 are snapped into the first, second and third snap holes 132, 134, 136 respectively of second plate 64 1so that the snap tabs 82 spring inwardly during insertion and spring outwardly with the lips 84 engaging the vertical plate 128 to retentively hold the trigger assembly 60 together.

The trigger assembly 60 is then attached to the bottom wall 14 of the housing 12 by inserting the snap tabs 138 into the snap receiving holes 32 so that the lips 140 retentively engage the bottom wall 14 and hold the trigger assembly 60 in place.

The assembled unit can be seen in FIG. 4. In this position one of the arms 90 of rotatable member 66 engage the shoulder 116 of trip member 68. The paddle 52 of paddle member 50 is yieldably urged by spring 56 in a counter-clockwise direction, and engages one of the arms 90 of rotatable member 66 so as to urge rotatable member 66 in a counterclockwise direction. This causes the lower most arm 90 to engage the shoulder 116 and prevent rotation of either the paddle member 50 or the rotatable member 66.

When a rodent such as a mouse enters opening 44 and engages the trip pan 120 of trip member 68, it causes the trip member to rotate in a counterclockwise direction to lower the shoulder 116 and to raise the counterweight 126. The lowering of shoulder 116 releases the rotatable member 66 so that it can rotate in a counterclockwise direction, and this permits the paddle member 50 to rotate in a clockwise direction in response to the spring 56. This causes the paddles 52 to push the mouse or rodent from the central chamber 40 into the trap chamber 42.

The rotation of the paddles 52 also causes the paddles 52 to engage the forward finger 96 of trip return member 70 thereby causing it to rotate in a counterclockwise direction. This brings cam surface 100 into contact with cam plate 122 and urges the cam plate 122 in a clockwise direction back to its untripped position. In this untripped position, trip shoulder 116 is again in a position to engage one of the arms 90 and prevent rotation of both the rotatable member 66 and the paddle member 50.

The extension of the third shaft 80 through the lost motion hole 118 permits limited pivotal movement of the trip member 68 between its tripped and untripped position.

Figure 5:
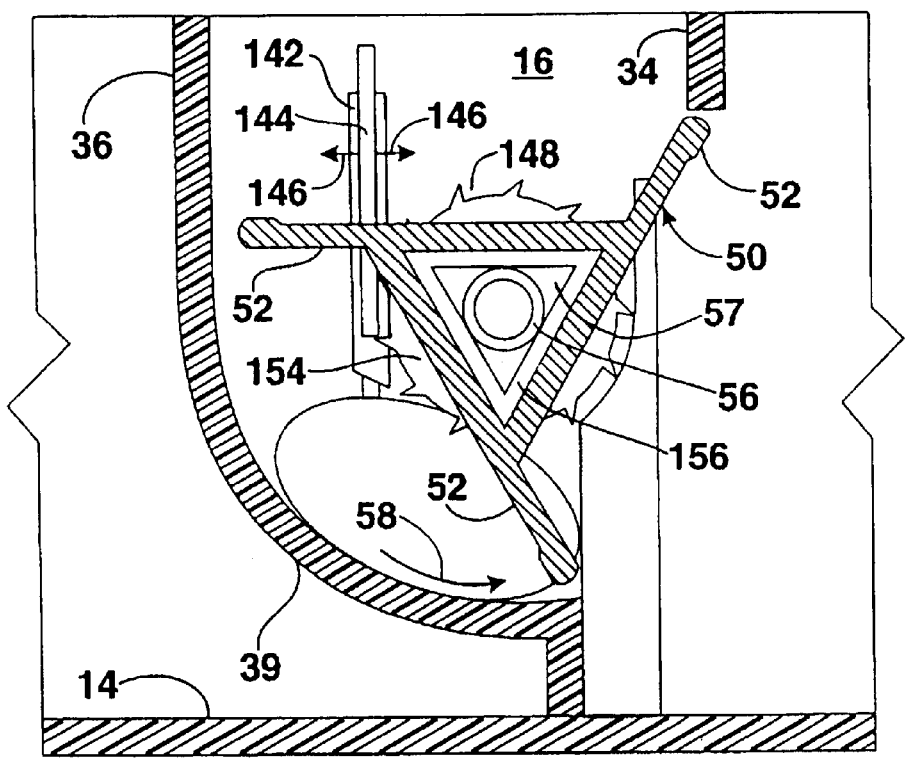
FIG. 5 is a sectional view taken along line 5—5 of FIG. 1.

Referring to FIGS. 5 and 6 the anti-backspin mechanism of the present invention is shown. The anti-backspin mechanism includes a pawl window 142 having a pawl 144 suspended on the interior surface thereof and extending downwardly. The pawl 144 is formed integrally with the wall 16 of the housing by means of plastic molding, and the lower end of pawl 144 is capable of limited springing movement back and forth in the direction of arrows 146.

Spring pawl 144 engages ratchet teeth 152 so as to prevent the paddle 50 and the ratchet member 148 from rotating in a clockwise direction as shown in FIG. 5. Because of the spring nature of pawl 144, the paddle 50 can rotate in a counterclockwise direction as viewed in FIG. 5 because the pawl 144 cams outwardly in response to the inclined side of the teeth 152.

The advantage of the anti-backspin mechanism is that it prevents the animal from physically rotating the paddle 50 in a clockwise direction as viewed in FIG. 5 and therefore prevents the animal from exiting from the direction in which the animal entered.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. An animal trap comprising:

a housing having opposite ends, an entrance chamber, a trap chamber, an entrance opening communicating with said entrance chamber;

an elongated paddle member within said housing having a central axis and a plurality of paddles extending radially outwardly therefrom, said paddle member being rotatably mounted within said housing for rotation about said central axis;

a first anti-backspin member attached to said housing;

a second anti-backspin member attached to said paddle and being retentively engaged by said first anti-backspin member to permit said paddle to rotate in said first direction and to prevent rotation of said paddle in a second direction opposite from said first direction;

a spring operably secured by said second anti-backspin member and yieldably urging said paddle member in a first rotational direction for causing one of said paddles to push an animal from said entrance chamber into said trap chamber;

a trigger assembly comprising a rotatable member having radially extending arms, an animal actuated trip member, and a trip return member;

said rotatable member being movable from a latched position wherein said radially extending arms engage said paddle member to prevent rotation thereof to an unlatched position permitting said rotatable member to rotate in response to said spring;

said trip member being in an untripped position engaging said rotatable member to prevent rotation thereof, and being movable in response to engagement by an animal to a tripped position permitting said rotation member to move to said unlatched position; and said trip return member being movable from an inoperative position to an operative position in response to rotation of said paddle member wherein said trip return member engages said trip member and returns said trip member from said tripped position to said untripped position.

2. The animal trap of claim 1 wherein said first anti-backspin member comprises a spring pawl and said second anti-backspin member comprises a ratchet wheel having ratchet teeth retentively engaged by said spring pawl.

3. The animal trap of claim 2 wherein said housing is comprised of molded plastic and said spring pawl comprises an integral part of said molded plastic housing.

4. An animal trap comprising:

a housing having exterior walls forming an enclosed compartment including an entrance compartment and a trap compartment, an animal opening being formed in said housing providing access for an animal to enter said entrance compartment;

a trigger member within said entrance compartment and being movable from a set position to a triggered position in response to being engaged by an animal within said entrance compartment;

a paddle mounted for rotation within said enclosed compartment;

an anti-backspin mechanism for preventing said paddle from rotating in a second rotational direction opposite from said first rotational direction, said anti-backspin mechanism permitting movement of said paddle in said first rotational direction;

a spring operably secured by said anti-backspin mechanism and urging said paddle in a first rotational direction for engaging said animal and moving said animal from said entrance compartment to said trop compartment; and a latch mechanism in a latched position engaging said paddle and preventing said paddle from moving in said first rotational direction, said latch mechanism being movable to a release position in response to said trigger member moving to said triggered position for releasing said paddle to rotate in said first direction in response to said spring;

said anti-backspin mechanism comprising a ratchet wheel having ratchet teeth thereon and being attached to said paddle, and a spring pawl attached to said housing and engaging one of said ratchet teeth.

5. An animal trap comprising:

a housing having opposite ends, an entrance chamber, a trap chamber, an entrance opening communicating with said entrance chamber;

an elongated paddle member within said housing having a central axis and a plurality of paddles extending radially outwardly therefrom, said paddle member being rotatably mounted within said housing for rotation about said central axis;

a spring yieldably urging said paddle member in a first rotational direction for causing one of said paddles to push an animal from said entrance chamber into said trap chamber;

a trigger assembly comprising a rotatable member having radially extending arms, an animal actuated trip member, and a trip return member;

said rotatable member being movable from a latched position wherein said radially extending arms engage said paddle member to prevent rotation thereof to an unlatched position permitting said rotatable member to rotate in response to said spring;

said trip member being in an untripped position engaging said rotatable member to prevent rotation thereof, and being movable in response to engagement by an animal to a tripped position permitting said rotatable member to move to said unlatched position;

said trip return member being movable from an inoperative position to an operative position in response to rotation of said paddle member wherein said trip return member engages said trip member and returns said trip member from said tripped position to said untripped position;

a first anti-backspin member attached to said housing, said first anti-backspin member comprising a spring pawl;

a second anti-backspin member attached to said paddle and being retentively engaged by said first anti-backspin member to permit said paddle to rotate in said first direction and to prevent rotation of said paddle in a second direction opposite from said first direction, said second anti-backspin member comprising a ratchet wheel having ratchet teeth retentively engaged by said spring pawl.

6. The animal trap of claim 5 wherein said housing is comprised of molded plastic and said spring pawl comprises an integral part of said molded plastic housing.

7. An animal trap comprising:

- a housing having exterior walls forming an enclosed compartment including an entrance compartment and a trap compartment, an animal opening being formed in said housing providing access for an animal to enter said entrance compartment;
- a trigger member within said entrance compartment and being movable from a set position to a triggered position in response to being engaged by an animal within said entrance compartment;
- a paddle mounted for rotation within said enclosed compartment;
- a spring urging said paddle in a first rotational direction for engaging said animal and moving said animal from said entrance compartment to said trap compartment;
- a latch mechanism in a latched position engaging said paddle and preventing said paddle from moving in said first rotational direction, said latch mechanism being movable to a release position in response to said trigger member moving to said triggered position for releasing said paddle to rotate in said first direction in response to said spring;
- an anti-backspin mechanism for preventing said paddle from rotating in a second rotational direction opposite from said first rotational direction, said anti-backspin mechanism permitting movement of said paddle in said first rotational direction, said anti-backspin mechanism comprising a first anti-backspin member attached to said paddle and a second anti-backspin member attached to said housing and retentively engaging said first anti-backspin member, said first anti-backspin member comprising a ratchet wheel having ratchet teeth thereon, and said second anti-backspin member comprising a spring pawl engaging one of said ratchet teeth.

* * * * *